United States Patent
Hale

[15] 3,678,657
[45] July 25, 1972

[54] FLUID POLLUTION ERADICATOR SYSTEM INCLUDING AN AIR BUBBLE SCRUBBING UNIT

[72] Inventor: Edith A. Hale, 310 E. 44th St., New York, N.Y. 10017

[22] Filed: Jan. 7, 1970

[21] Appl. No.: 1,148

Related U.S. Application Data

[63] Continuation-in-part of Ser. No. 656,447, July 27, 1967, abandoned.

[52] U.S. Cl. .................................55/222, 55/255, 55/269, 55/418, 55/446, 55/524, 55/DIG. 24, 55/DIG. 30, 60/30 L
[51] Int. Cl. ..........................................B01d 50/00
[58] Field of Search .....................55/DIG. 30, 84, 89, 93, 94, 55/95, 255, 256, 222, 268-269, 418, 442-446, DIG. 24; 123/119 B; 60/29, 30, 31; 165/111, 103, 55, 60, 123

[56] References Cited

UNITED STATES PATENTS

| | | |
|---|---|---|
| 764,922 | 7/1904 | Davis........................................55/268 |
| 1,132,194 | 3/1915 | Leao.........................................55/269 |
| 1,917,857 | 7/1933 | Searles..............................55/DIG. 24 |
| 2,403,261 | 7/1946 | Clark.........................................55/524 |
| 2,488,563 | 11/1949 | Sills........................................60/30 L |
| 2,612,745 | 10/1952 | Vecchio.....................................55/256 |
| 2,966,036 | 12/1960 | Stowens........................................60/29 |
| 3,100,146 | 8/1963 | Huntington........................55/DIG. 30 |
| 3,153,579 | 10/1964 | Levey et al. ...............................60/30 |
| 3,456,439 | 7/1969 | Hale .........................................55/524 |
| 477,812 | 6/1892 | Nelson....................................165/103 |
| 1,739,367 | 12/1929 | Love...........................................55/314 |
| 1,916,528 | 7/1933 | Raymond..................................55/310 |

Primary Examiner—Bernard Nozick
Attorney—Borst & Borst

[57] ABSTRACT

A fluid pollution eradication and air bubbling system having a cooling condenser unit for removing vapor, a baffle plate unit for removing solid impurities, and a fluid scrubbing and neutralizing unit. The baffle unit contains removable baffle plates with air foils which are coated with a sticky substance for removing the impurities from the fluid while in a state of turbulence and the fluid scrubbing and neutralizing unit comprises a series of bubbling tanks for scrubbing, neutralizing and deodorizing the polluted fluid. Preferably an alternate bubbling unit is provided whereby the first unit may be shut down completely for repair or cleaning purposes.

5 Claims, 4 Drawing Figures

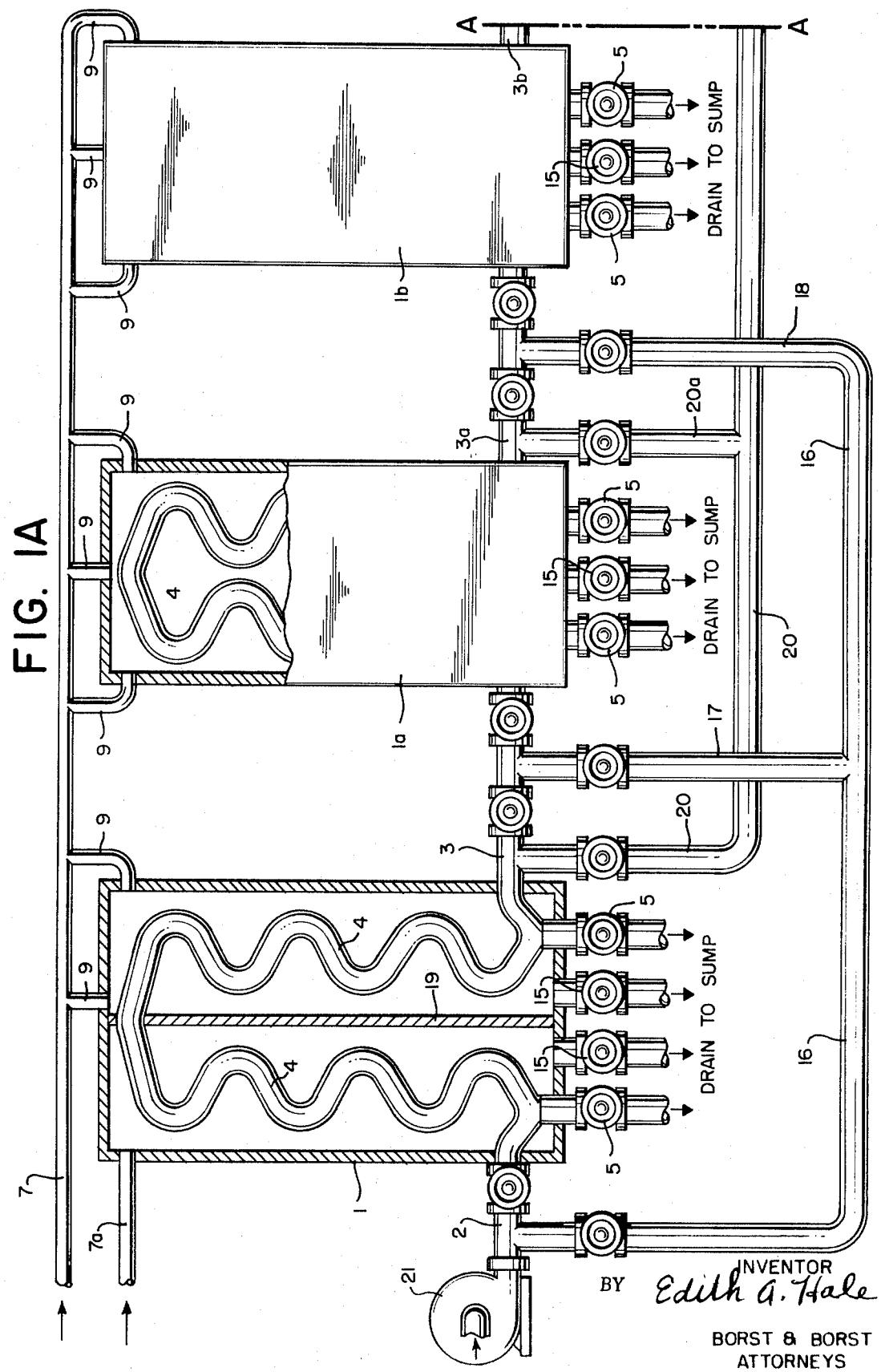

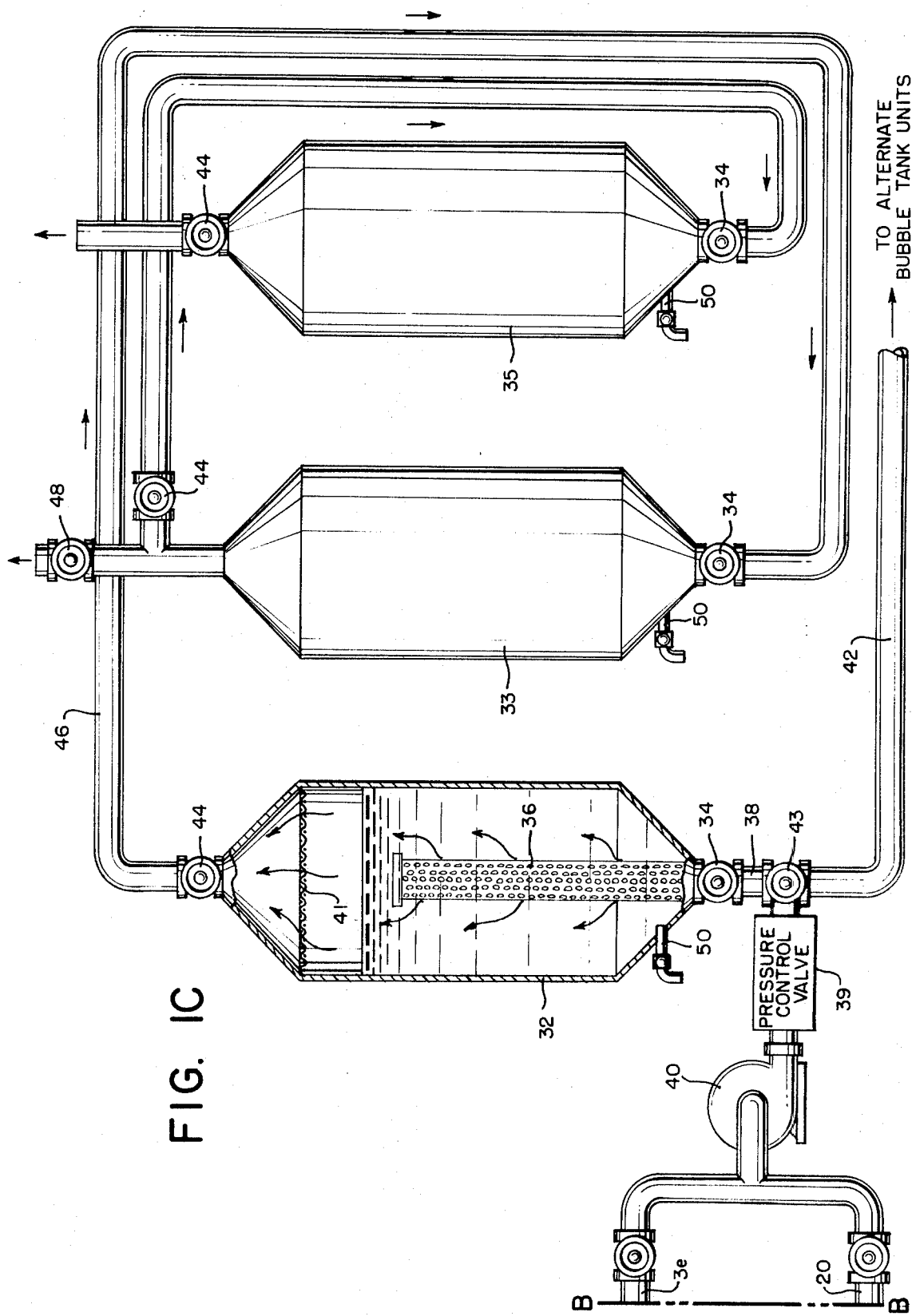
FIG. IC

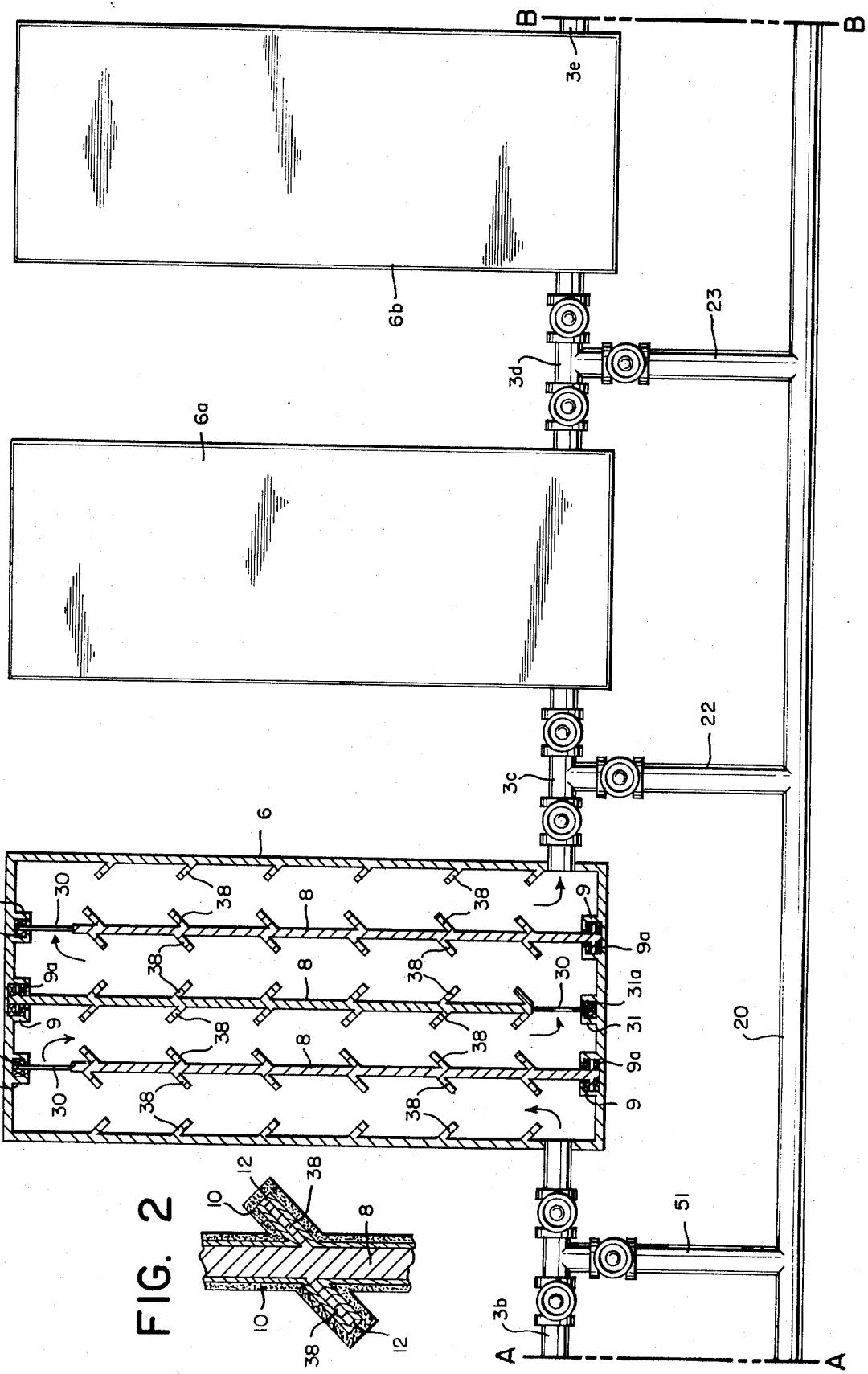

FLUID POLLUTION ERADICATOR SYSTEM INCLUDING AN AIR BUBBLE SCRUBBING UNIT

This application is a continuation-in-part of application Ser. No. 656,447 filed July 27, 1967 now abandoned.

This invention relates to air pollution eradicators and, in more particular, such eradicators which are especially adapted for use in the exhaust side of utility power and manufacturing plants, incinerators and the like.

The present pollution eradicating system comprises a combination of units for removing the smog that commonly invests the atmosphere over large cities and industrial areas. The system is adapted to be disposed at the exhaust end of chimneys of manufacturing plants, utilities, incinerators, apartment houses, etc., the individual units thereof being appropriately scaled. Smog consists essentially of fog, which is mostly water vapor and smoke which contains physical particles, such as soot and fly ash, and gasses such as carbon dioxide and carbon monoxide. The system is also designed to remove hydrocarbon chemicals. In order to remove as many of the pollutants as possible from the smog, the system is designed in three basic sections; the fog removal section where vapor is removed from the smog, the solids removal section for the elimination of physical particles, and gas removal section where noxious gases are allowed to separate for eventual disposal.

It has been found that air purifying equipment can have a tendency to adversely affect the operational efficiency of the facility producing the pollution due to the creation of abnormally high pressure on the exhaust side thereof. There is therefore provided in the purifying system an air pressure reducer which draws the air positively through the system which also includes a cooling condenser which serves to reduce fluid pressure as well as eliminate a portion of the smog which is its basic function.

One object of the invention is to provide an efficient pollution eradicator adapted to be used in facility exhaust systems without adversely affecting their operation.

Other objects and advantages of the present invention may be appreciated on reading the following specific description of one embodiment thereof which is taken in conjunction with the accompanying drawings, in which FIGS. 1A, 1B and 1C show diagrammatically the fluid purifying and neutralizing system for use in the outlet end of a plant exhaust.

FIG. 2 is an enlarged fragmentary section showing a portion of a filter plate in the solid removal section.

Referring to the drawing fluid condenser 1 in the fog removal section having a fluid inlet line 2 and outlet valve 3 and containing an S shaped pipe 4 into which the exhaust gases are drawn. The condenser serves to condense and eliminate any moisture content in the fluid. The cooling should be sufficient for this purpose to bring the temperatures of the fluid down to at least 50° F. The condensed moisture in the condenser drains off through valves 5 in the bottom thereof carrying off some of the hydrocarbon debris as well. A cold water line 7 supplies water to the second half portion of the condenser at two inlet connections 9 and drains off to a sump through valve 15 in communication with the bottom of the condenser. Water line 7a admits water which is somewhat warmer than the water in the line 7 to the first half portion of the condenser 1 which is divided by partition 19. Since the exhaust gases in the pipe 2 are normally extremely hot the risk of bursting the pipe is minimized in this manner.

If desired, one or more additional condenser units may be provided for more complete removal of the vapor and chemicals from the pollution fluid. In FIG. 1A, there is shown a second unit 1a and a third unit 1b, the components of which are the same as the corresponding elements in unit 1. Valve line 3 connects units 1 and 1a directly while valve line 3a directly connects units 1a and 1b. Appropriate valves and piping are shown for use when it is desired to shut down one or more of the units for cleaning or repair purposes while the system is in operation. To this end there is, for example, provided by pass line 16 and exit valve lines 17 and 18 connected to the line 16 on each side of condenser units 1 or units 1 and 1a or unit 1a alone are to be by-passed and a second by-pass line 20 to connect the unit 1 directly to the output of the fog removal section thus by-passing units 1a and 1b. Valve line 20a connected between line 3a and line 20 is employed when it is desired to connect unit 1a to the output of the section thus effectively by-passing unit 1b. It is to be noted that each unit by-pass line, for example, lines 17, 16 and 18, have two control valves as also does the input pipes for the units, for example, pipe 3a, the by-passing pipes being connected to the input pipes between its two control valves.

Disposed in line 2 is fluid blower 21 of the centrifugal type which draws the polluted fluid from the power plant and impells it directly into the system via lines 2 or 16.

The cooled and moisture free gases flow by means of pipe 3b or by-pass line 20 from the fog removal section shown in FIG. 1A to the solid removal section, shown in FIG. 1B of the fluid pollution eradicator system. The solid removal section, as shown, comprises three baffle plate units 6, 6a and 6b, each unit having a plurality of filter plates 8 alternately secured to the top and bottom of the unit the maximum, feasible distance for the fluid flow. The plates are removable being supported in grooves 9 containing bearings 9a. The plates are shorter than the height of their unit to permit passage of the fluid about their free ends which are, however, supported by V-shaped rods 30 slidably disposed within grooves provided by brackets 31 having bearings 31a located alternately on the top and bottom of the unit. When the fluid flow is introduced to the section on pipe line 3b, the unit 6 may be by-passed by means of valve line 51 connecting the line 3b to by-pass line 20. In normal operation of the section using all the baffle plate units the fluid passes from baffle unit 6 to unit 6a by valve line 3c and from unit 6a to unit 6b by means of valve line 3d. The output of the unit 6b flows to the following and final section of the system on valve line 3e.

Preferably, as shown in FIG. 2, the plates in the baffle unit have an aluminum, plastic or tin lining sheet 12 to which the adhesive substance 10 is applied. In practice the plastic lining is cemented to the baffle plates but is removable therefrom for subsequent replacement after it has become completely contaminated. One such plastic material now available is produced by Minnesota Mining and Manufacturing Co., which calls it a "Scotch" brand shaping tape designated as Cat. No. 44.

Each side of the filter plates 8 have fluid turbulence producing baffles 38 which are plastic lined and adhesive coated. The baffles are inclined against the flow so as to produce maximum turbulence and adhesive contact with the fluid. One adhesion which is considered to effectively attract the solid impurities in the combustion gasses consists of a combustion comprising approximately 63 percent rosin, 5 percent mineral oil and 32 percent rubber. Less than 1 percent of a moisturizer, such as glycerin, may be added, if desired.

By-pass valve tubes 22 and 23 connected to line 20 on each side respectively of the baffle unit 6a are used in case the unit 6a or 6b is shut down for cleaning purposes. Additional baffle units may be provided as desired.

The partially purified fluid is drawn into the gas neutralizing section of the system shown in FIG. 1C either on by-pass line 20 or directly from the last unit in the solid removal section by means of valve line 3e. The fluid scrubbing and neutralizing section includes a pump 40 and tanks 32 containing a non-foaming detergent such as "Calgonite" produced by Calgon Corp. or "Cascade" made by Procter & Gamble Mfg. Co. and a neutralizing tank 33 containing either an alkali neutralizing solution such as acetic acid, $CH_3CO$ for "wood" burning products of combustion or an acid neutralizing solution such as sodium bicarbonate for fossil burning products, and tank 35 which contains a deodorant such as "Liquid Airwick" produced by Airkem Inc. Each tank contains a perforated pipe 36 connected to an inlet valve 34 connected on the outlet side of pipe 38 the pressure in which may be regulated by control valve 39. The partially polluted gasses are bubbled up through the solutions in each tank which may all be shut down by the inlet valves 34 so that pipe 42 and valve 43 may be used to lead the gasses from valve 39 to an alternate scrubbing and neutralizing unit identical to the one herein described. Each tank contains in its top portion an air filtering screen 41 for further cleansing purposes. Each tank is provided with an outlet control valve 44. Valve 44 in the outlet of tank controls the fluid flow in pipe 46 to tank 33 which may be vented to atmosphere through valve 48. Some pollutants need not be deodorized, but if deodorization is needed valve 48 is closed and valve 44 in the outlet side of tank 38 is opened whereby the fluid may pass to the deodorizing tank 35.

The solutions in each tank may be drained off through drainage pipe 50 and replaced. While the solutions are being renewed the entire unit described is shut down and the fluid emanating from the baffle unit is passed to an alternate scrubbing unit composed of the same composition and arrangement of scrubbing, neutralizing and deodorizing tanks as described above.

Modifications of the invention may be effected by persons skilled in the art without departing from the scope and principle of the invention as defined in the appended claims.

What is claimed is:

1. In a fluid pollution eradicator comprising a fluid intake line, a first fluid moisture removing unit connected to said intake line, a second moisture removing unit connected to said intake line, valve means interposed between said intake line and said units respectively for controlling the flow of fluid from said intake line to said units respectively, said units having piping connected with the inlet from said valve means and providing a tortuous flow of the fluid through said units respectively and separating the flow thereof from cooling mediums within the units, an impurity removing baffle system including a plurality of filter units each having a plurality of filter plates arranged therein with flow passageways disposed at alternate ends of adjacent plates, said plates having baffles on each side thereof arranged for producing turbulence in the fluid flowing through said filter units, said plates being coated with an impurity removing adhesive substance, piping connecting said filter units with each of said moisture removing units, and valve means in said last mentioned piping for controlling the flow from the moisture removing units to said filter units respectively, and a fluid scrubbing and neutralizing unit connected to the output of said baffle system and including at least two communicating tanks, said two communicating tanks containing respectively a foamless detergent and a neutralizing chemical, and means for producing a bubbling of the fluid from the baffle system through said detergent and said neutralizing tanks.

2. In a fluid eradicator system as defined in claim 1, wherein a container is arranged in the fluid flow line containing a fluid deodorizing solution.

3. In a fluid pollution eradicator system as defined in claim 1, wherein said bubbling of the fluid is produced by an upstanding perforated pipe connected to the inlet portion of each of said communicating tanks.

4. In a fluid pollution eradicator system as defined in claim 1, wherein each of said communicating tanks is provided with an air filter at its upper portion thereof.

5. In a fluid pollution eradicator system as defined in claim 1, wherein the adhesive coating on the filter plates consists of about 63 percent resin, 5 percent mineral oil and 32 percent rubber.

* * * * *